(12) United States Patent
Squire

(10) Patent No.: US 12,649,072 B2
(45) Date of Patent: Jun. 9, 2026

(54) SYSTEMS AND METHODS FOR TENSIONING A LIFELINE

(71) Applicant: Latchways Plc, Dorset (GB)

(72) Inventor: Jacob Thackeray Squire, Dorset (GB)

(73) Assignee: MSA Technology, LLC, Cranberry Township, PA (US)

( * ) Notice: Subject to any disclaimer, the term of this patent is extended or adjusted under 35 U.S.C. 154(b) by 126 days.

(21) Appl. No.: 18/723,570

(22) PCT Filed: Dec. 21, 2022

(86) PCT No.: PCT/EP2022/087362
§ 371 (c)(1),
(2) Date: Jun. 24, 2024

(87) PCT Pub. No.: WO2023/126285
PCT Pub. Date: Jul. 6, 2023

(65) Prior Publication Data
US 2025/0050142 A1 Feb. 13, 2025

(30) Foreign Application Priority Data

Dec. 27, 2021 (GB) ..................................... 2119044

(51) Int. Cl.
| | |
|---|---|
| *A62B 35/00* | (2006.01) |
| *A62B 35/04* | (2006.01) |
| *F16G 11/10* | (2006.01) |
| *F16G 11/12* | (2006.01) |

(52) U.S. Cl.
CPC ...... *A62B 35/0075* (2013.01); *A62B 35/0056* (2013.01); *A62B 35/04* (2013.01); *F16G 11/101* (2013.01); *F16G 11/12* (2013.01)

(58) Field of Classification Search
CPC . A62B 35/0075; A62B 35/0056; A62B 35/04; A62B 35/0093
USPC .......................... 248/548; 254/368, 375, 903
See application file for complete search history.

(56) References Cited

U.S. PATENT DOCUMENTS

| | | | | | |
|---|---|---|---|---|---|
| 2,321,248 | A | * | 6/1943 | Rose ......................... | A62B 1/02 104/113 |
| 5,004,071 | A | * | 4/1991 | Mallard ................. | A62B 35/04 410/82 |
| 5,358,068 | A | * | 10/1994 | Whitmer ............. | E04G 21/3204 182/113 |
| 5,577,576 | A | * | 11/1996 | Petzl ........................ | A62B 1/14 188/65.4 |

(Continued)

OTHER PUBLICATIONS

Patent Cooperation Treaty, PCT/EP2022/087362, International Search Report and Written Opinion; May 4, 2023.

*Primary Examiner* — Anita M King
(74) *Attorney, Agent, or Firm* — Jones Day

(57) ABSTRACT

Systems and methods are provided for a tensioning device configured for increasing tension in a line. A system may include a rotating member configured to support a line, the rotating member being configured to rotate around a shaft. A locking member is configured to limit movement of the line when the line is supported by the rotating member. A tensioning handle is configured to have a closed position and an open position, where the tensioning handle is disengaged from the shaft when in a closed position, and where the tensioning handle is configured to be engaged with the shaft when the tensioning handle is in an open position.

20 Claims, 13 Drawing Sheets

(56)         References Cited

U.S. PATENT DOCUMENTS

|             |       |         |                              |
|-------------|-------|---------|------------------------------|
| 6,446,936   | B1    | 9/2002  | Ostrobrod                    |
| 7,862,008   | B2    | 1/2011  | Woodruff                     |
| 8,100,231   | B2 *  | 1/2012  | Petzl ................ A62B 1/14 |
|             |       |         | 182/5                        |
| 8,733,504   | B2 *  | 5/2014  | Mauthner ........... A62B 35/04 |
|             |       |         | 182/5                        |
| 10,413,762  | B2 *  | 9/2019  | Patton ............. A62B 35/0037 |
| 11,065,477  | B2 *  | 7/2021  | Ratalino ............ A62B 1/14 |
| 11,660,475  | B2 *  | 5/2023  | Malcolm ............. A62B 1/14 |
|             |       |         | 182/193                      |
| 12,128,258  | B1 *  | 10/2024 | Stroshane .......... B61H 9/02 |
| 2019/0209878 | A1   | 7/2019  | Newing et al.                |
| 2022/0241626 | A1 * | 8/2022  | Yang ............. B65H 75/4442 |

* cited by examiner 1004    1002

ACCEPTING A LINE AT AN ENTRY POINT OF A TENSIONING DEVICE, WHERE INITIAL TENSIONING OF THE LINE IS PROVIDED BY HAND
1302

ENGAGING A LOCKING MEMBER AGAINST THE LINE TO LIMIT MOVEMENT OF THE LINE
1304

ENGAGING A TENSIONING HANDLE WITH A SHAFT OF A ROTATING MEMBER SUPPORTING THE LINE
1306

PROVIDING ADDITIONAL TENSIONING OF THE LINE VIA ROTATION OF THE TENSIONING HANDLE
1308

SYSTEMS AND METHODS FOR TENSIONING A LIFELINE

CROSS-REFERENCE TO RELATED APPLICATION

This application is a U.S. National Stage Application under 35 U.S.C. § 371 of International Patent Application No. PCT/EP2022/087362, filed Dec. 21, 2022, which claims priority to United Kingdom Patent Application No. GB2119044.2, filed Dec. 27, 2021, the disclosures of which is are incorporated by reference in their entireties.

BACKGROUND

In height safety applications, such as, for example, working on a building roof, it is common for a safety apparatus to be provided that includes a safety line, such as a horizontally oriented safety line, to which an operative is secured using a harness connected tether. In order to move along the roof while connected to the horizontally orientated safety line, a traveller is provided for the tether, which permits the harness connected tether to move along the horizontally orientated safety line.

SUMMARY

Systems and methods are provided for a tensioning device configured for increasing tension in a line. A system may include a rotating member configured to support a line, the rotating member being configured to rotate around a shaft. A locking member is configured to limit movement of the line when the line is supported by the rotating member. A tensioning handle is configured to have a closed position and an open position, where the tensioning handle is disengaged from the shaft when in a closed position, and where the tensioning handle is configured to be engaged with the shaft when the tensioning handle is in an open position.

In another example, a tensioning line system includes a line configured for connection to a first rigid structure. A tensioning device includes a rotating member configured to rotate around a shaft; a locking member configured to limit movement of the line; and a tensioning handle configured to have a closed position and an open position, where the tensioning handle is disengaged from the shaft when in a closed position, and where the tensioning handle is configured to be engaged with the shaft when the tensioning handle is in an open position. The tensioning device is configured to be directly or indirectly connected to a second rigid structure.

In another example, an example method of increasing tension in a line is provided. A line is accepted at an entry point of a tensioning device such that the line is guided around a rotating member and exits the tensioning device at an exit point, where initial tensioning of the line is provided via hand pulling of the line through the exit point. A locking member is engaged against the line, where the locking member is configured to limit movement of the line such that the line can only be rotated around the rotating member in one direction. A tensioning handle is engaged with a shaft of the rotating member when the tensioning handle is transitioned from a closed position to an open position, and additional tensioning of the line is provided when the handle is rotated via corresponding rotation of the shaft and the rotating member.

DETAILED DESCRIPTION

System and methods as described herein provide techniques for, in embodiments, increasing the tension in a line, such as a safety line (e.g., preferably a rope safety line, in other instances a wire line, a twisted or braided wire line) used for fall prevention and mitigation of persons and equipment operating at height. In certain examples, a tensioning device is provided that enables increasing the tension in the line without the use of tools that are external to the tensioning device. In examples, the line can be tensioned to a desired level without the use of a wrench or other external handle for providing sufficient leverage to wind the line to provide the desired level of tension. Such an implementation can be particularly beneficial in applications where the line is secured at or near the top of a structure, such as a building, which is being constructed or repaired. In certain of those instances, people or property of value may be positioned underneath the line, such that dropping or other loss of tools could cause substantial injury or damage those below.

Figure 1:
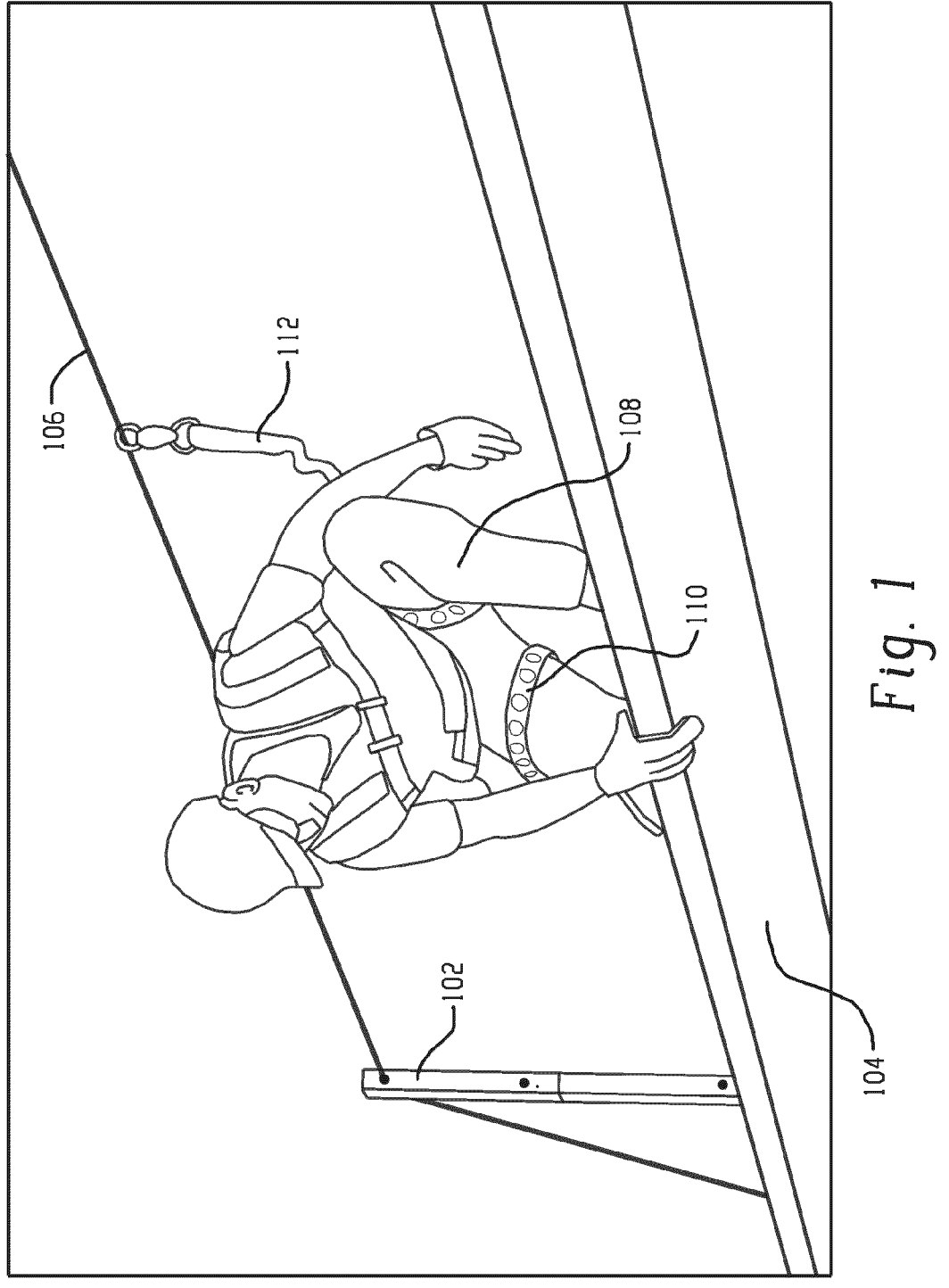
FIG. 1 is a diagram depicting a safety line system securing a person performing construction operations at the top of a structure.

FIG. 1 is a diagram depicting a safety line system securing a person performing construction operations at the top of a structure. The system includes a first rigid member 102 that takes the form of a vertical post extending from a horizontal component 104 of the structure. The first rigid member 102 may be connected to the horizontal component 104 via mechanical means such as bolts, screws, adhesive, or otherwise. A safety line 106 is connected to the first rigid member 102 and runs horizontally between the first rigid member 102 and a second rigid member (not shown). An operative 108, in the form of a person performing construction operations, wears a harness 110 via which the operative 108 is connected to the safety line 106 via a tether 112. The safety line arrangement of FIG. 1 enables the operative 108 to traverse the structure, anywhere within a tether length of the safety line. This is an improvement over arrangements where the operative 108 is tethered to a single point (e.g., the first rigid member 102), where the operative 108 could then only move within a tether length of that single point.

In order to provide effective fall protection and to avoid tangling of the safety line 106 with the operative 108 or other equipment, the safety line 106 is implemented under tension, such that the safety line remains taught, or substantially taught, at all times, even in a fall scenario. In many instances, the level of desirable tension in the safety line 106 is more than can be accomplished via hand tensioning during installation of the safety line 106. Systems and methods as described herein provide a tensioning device that is configured to increase tension in the safety line. In an embodiment, the tensioning device facilitates initial hand tensioning of the line. Subsequent increases in tension can be accomplished through a tensioning handle that can be transitioned from a closed to an open position. When moved to the open position, the tensioning handle is configured to be engaged with the shaft of a rotating member of the tensioning device such that the safety line can be wound around the rotating member and tightened so as to increase tension in the line.

Figure 2:
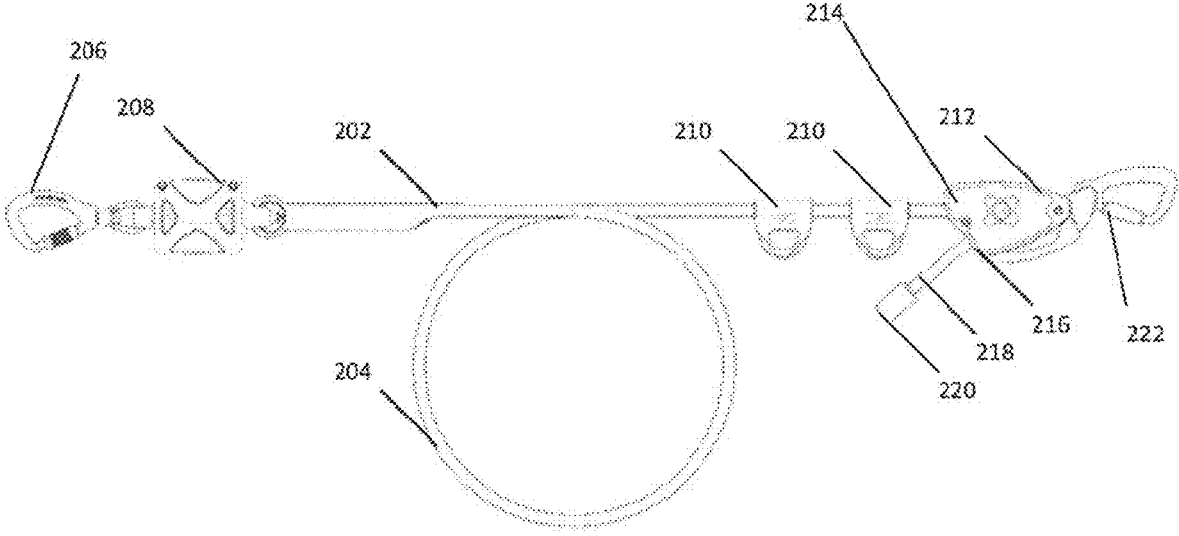
FIG. 2 is a diagram depicting an example tensioning line system.

FIG. 2 is a diagram depicting an example tensioning line system. The system includes a line 202 configured for connection to a rigid structure. In the example of FIG. 2, the line is in a partially stowed position, such that it is wound into a loop at 204, and not extended in a taught configuration as it would be deployed. The system includes a first connection device 206 for connecting the line 202 to a first rigid structure (not shown). In the example of FIG. 2, the first connection device 206 takes the form of a karabiner (carabiner) that is configured to clip the line 202 to the first rigid structure. In the example of FIG. 2, the line 202 is connected to the first connection device 206 indirectly via an energy absorber 208. The energy absorber 208 is configured to maintain the line 202 in a taught configuration during normal operation (e.g., the energy absorber 208 is designed to remain intact under the anticipated operating tension of the line 206). In embodiments, the energy absorber 208 is configured to expand (e.g., via partial or complete tearing of certain connecting fiber therein) when the energy absorber experiences an acute increase in line tension, as might be experienced during a fall event. The energy absorber 208 can, in certain instances, allow some slack to be introduced into the line 202 during a fall event to prevent the line 202 from breaking during that acute increase in force. The tensioning line system further includes one or more connectors 210 via which an operator or equipment may be connected to the line 202. In embodiments, the connectors 210 are configured to slide along the line 202 to facilitate movement along the line by persons or equipment connected to the line, such as via a harness, tether, and/or clip (e.g., a karabiner clip).

The tensioning line system further includes a tensioning device 212. As described further herein, the tensioning device 212 includes an entry point at 214 through which the line 202 is inserted (e.g., threaded such that it wraps around and supported by a rotating member therein). The tensioning device 212 further includes an exit point 216 for accommodating an excess portion 218 of the line after the line has traversed the tensioning device 212. In the example of FIG. 2, the line 202 includes an end stop 220 (e.g., a metal or plastic element that is crimped or otherwise attached to the end of the line 202) that prevents the line 202 from being unthreaded through the tensioning device after the line 202 is threaded through the tensioning device 212. The tensioning device 212 also includes a second connection device 222 in the form of a karabiner for connection to a second rigid structure. As discussed in further detail below, in embodiments, the second connection device 222 is configured to rotate as tension in the line 202 is increased. This rotation actuates a locking member (e.g., a locking cam) inside the tensioning device 212 that increases a force applied by the locking member to the line 202 for holding the line 202 in place, allowing the line 202 to be pulled through the tensioning device 212 only in one direction (e.g., out the exit point 216) when the locking member is engaged.

In operation, the depicted components (e.g., 206, 208, 210) are attached to the line 202. The line is threaded into the tensioning device 212 at the entry point 214 and out of the tensioning device at the exit point 216, where the end stop 220 may then be applied to prevent the line 202 from being released back out of the tensioning device 216. The first connection device 206 may be connected to a first rigid structure, and the second connection device 222 may be connected to a second rigid structure. Initial tensioning of the line 202 may be provided by hand, pulling the excess portion 218 of the line 202. Further tensioning of the line 202 may then be provided with assistance of a tensioning handle, as described herein that can provide additional leverage for adding tension to the line 202 when the handle is in an open position.

Figure 3:
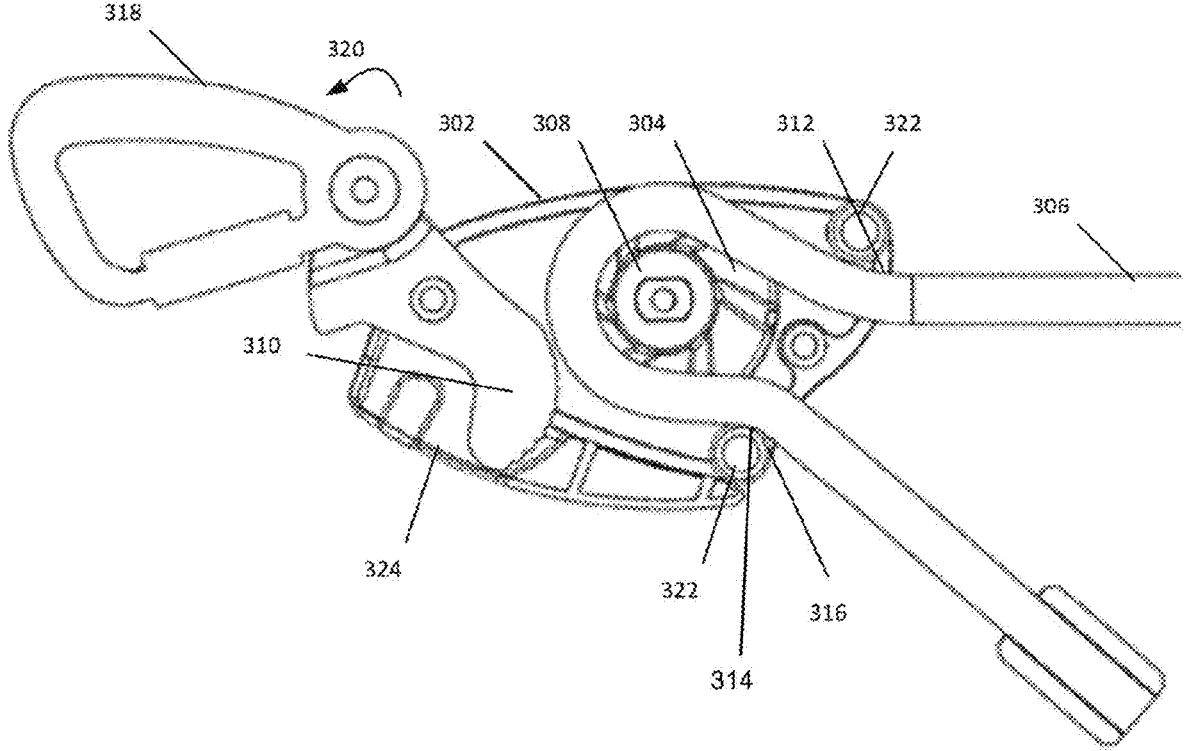
FIG. 3 is a diagram depicting an example tensioning device.

FIG. 3 is a diagram depicting an example tensioning device. The tensioning device includes an outer housing 302 that contains certain components therein. The device includes a rotating member 304 that is configured to support a line. The rotating member 304 may take a variety of forms including a pulley, a wheel, a single piece drum, a multipiece drum (e.g., two drum halves snapped together). The rotating member 304 may have a rounded, a flat, or a grooved surface for supporting the line 306 thereon. The rotating member 304 is configured to rotate around a shaft 308.

The tensioning device of FIG. 3 further includes a locking member 310. The locking member 310 is configured to limit movement of the line 306 when the line 306 is supported by the rotating member 304. In embodiments, the locking member 310, when engaged, is configured to only allow the line 306 to traverse the tensioning device in one direction (e.g., from an entry point 312 toward an exit point 314). In other embodiments, the locking member 310 may be configured to prevent all movement of the line 306 when engaged, or may be configured to substantially inhibit but not prevent movement of the line 306 (e.g., the line 306 can only be moved in one or both directions when acted upon with more than a threshold amount of force). In the example of FIG. 3, the locking member 310 takes the form of a locking cam that is connected to a karabiner 318. When the karabiner 318 is connected (e.g., to a rigid member, to an energy absorber, to an additional portion of line) such that it is part of a tensioned line configuration, the karabiner 318 and locking member 310 are rotated in the direction indicated at 320. That rotation 320 resulting from increased tension in the line 306 increases a force applied to the line 306 by the locking member 310 in pressing the line 306 between the rotating member 304 and the locking member 310. Teeth, grooves, or other texture in a surface of the locking member that interfaces with the line 306 may allow the line 306 to transit in one direction (e.g., from 312 to 316) but not the other. Guide rollers 322 may be positioned to provide smooth transition of the line 306 through the entry 312 and exit 316 points.

Figure 4:
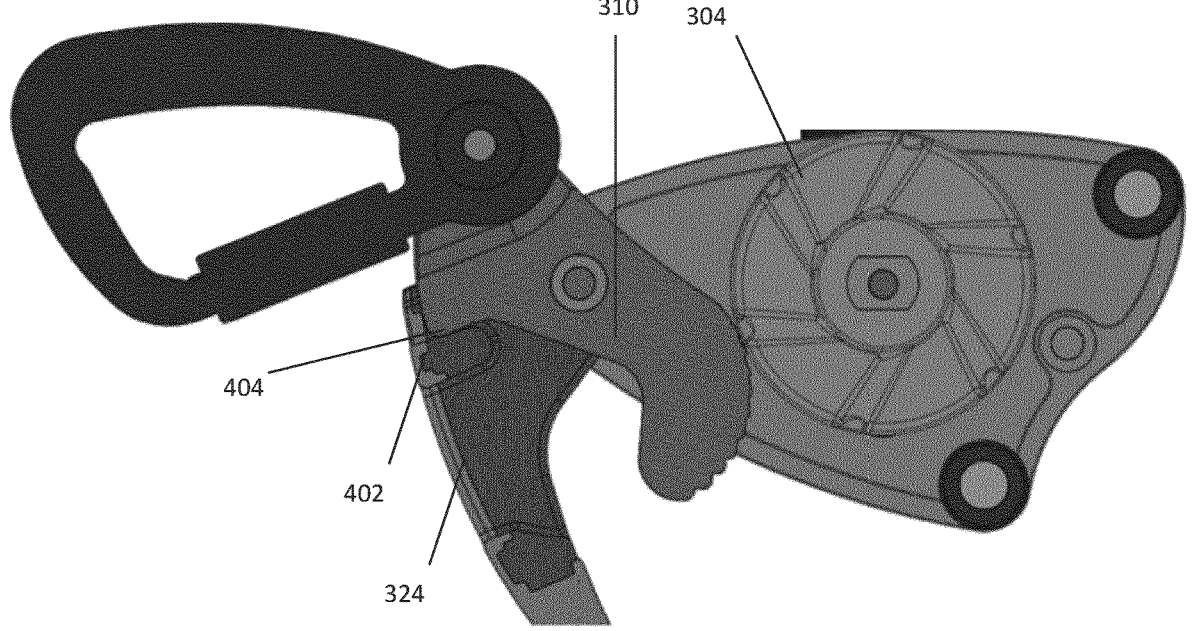
FIG. 4 is a diagram illustrating the release handle in an engaged position.

In embodiments, a release handle 324 may be provided for releasing the force applied to the line 306 by the locking member 310 when engaged. The release handle 324 is in a stowed position in FIG. 3. FIG. 4 is a diagram illustrating the release handle in an engaged position. When rotated from its stowed position to the engaged position, an interface tab 402 of the release handle contacts the locking member 310 at point 404. That contact rotates the locking member 310 away from the rotating member to at least partially disengage the locking member 310 so as to relieve the force applied to the line. In embodiments, when the release handle 324 is in the engaged position, the line 306 may be moved freely, or more freely, in any direction through the tensioning device.

As discussed above, initial tensioning of a line may be provided by pulling a line through the tensioning device, out of the exit point, and pulling to an initial tension by hand. In many instances, the level of tension that can be generated via hand tensioning is insufficient to ensure correct function of the safety line. That is, a properly functioning line may need to be implemented at a higher level of tension that can be achieved by a person pulling the line through the tensioning device. Embodiments herein include a tensioning handle via which additional tension can be imparted in the line to ensure operation of the line according to specification.

Figure 5:
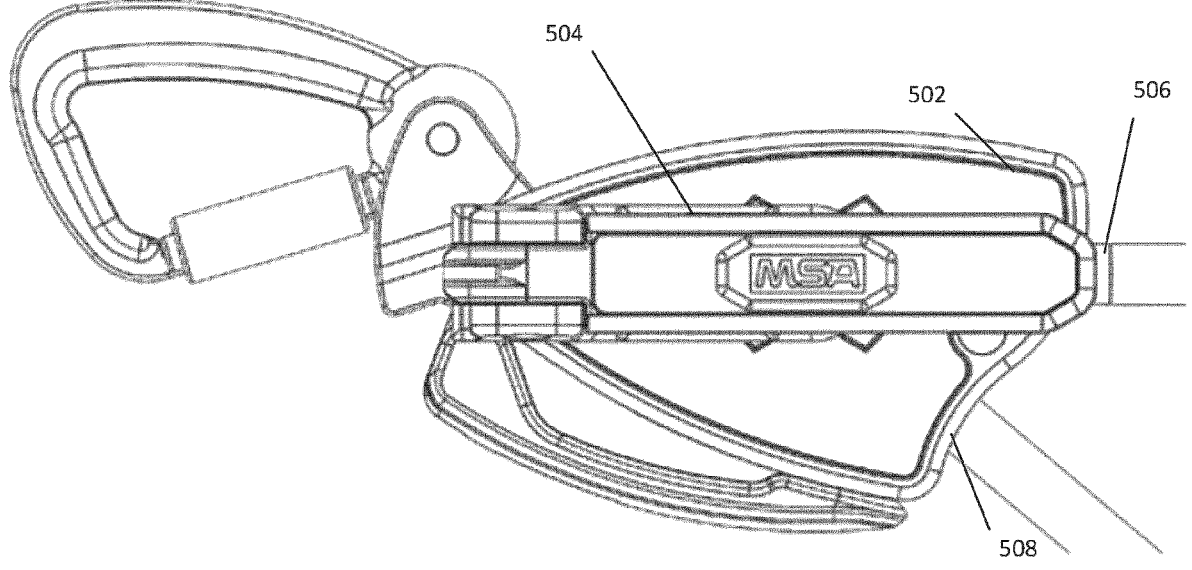
FIG. 5 is a diagram depicting a tensioning handle in a closed position.

FIG. 5 is a diagram depicting a tensioning handle in a closed position. The tensioning device includes an outer housing 502 in which certain components are positioned, as described above. A tensioning handle 504 is positioned at the exterior of the housing and is configured to, when operated, rotate the rotating member to pull more line into the entry point 506 of the tensioning device and out of the exit point 508 so as to increase the tension in the line. FIG. 5 depicts the tensioning handle in a closed position. In embodiments, when in the closed position, the tensioning handle is disengaged from the rotating member, as described further herein, such that any movement of the tensioning handle 504 has no effect on the rotating member. In embodiments, the tensioning handle 504 is held in place (e.g., kept from rotating) when in the closed position via a physical stop. In embodiments, the tensioning handle 504 is held closed via a magnet that provides a force to keep the tensioning handle 504 in the folded position.

Figure 6:
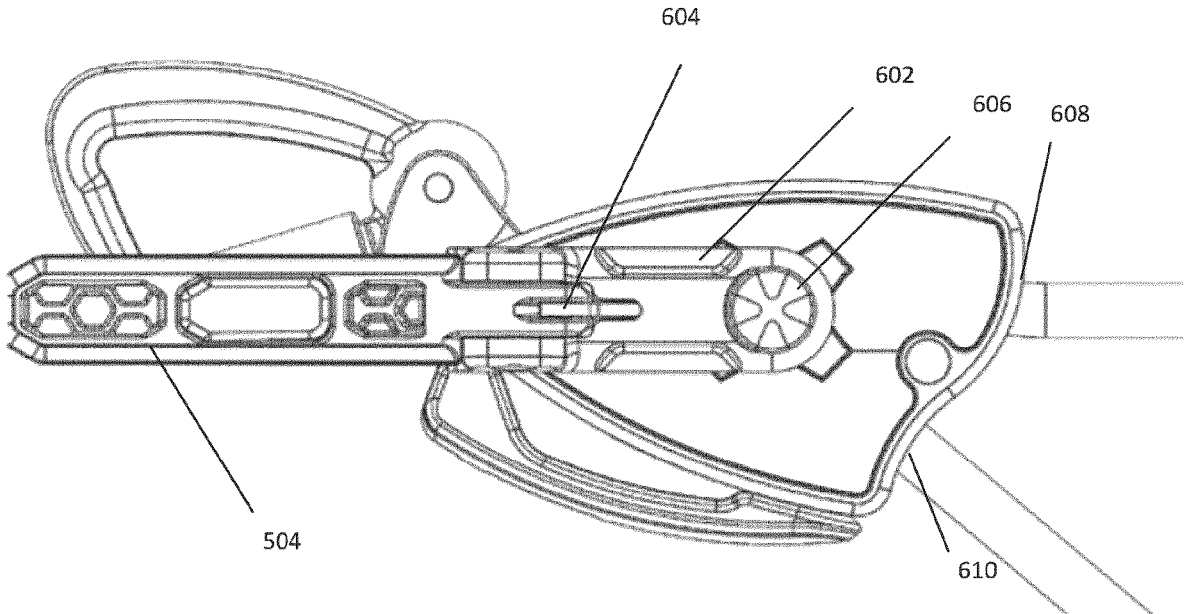
FIG. 6 is a diagram depicting a tensioning handle in an open position.

FIG. 6 is a diagram depicting a tensioning handle in an open position. The tensioning handle 504 can be extended from its closed position to an open position, as depicted in FIG. 6, when it is desirable to increase a tension level in the line. In an embodiment, where the tensioning handle 504 is held in the closed position via a magnet, the tensioning handle 504 is extended by an operator exerting a force on the tensioning handle 504 that is greater than the counter-force asserted by the magnet. The tensioning handle 504 is extended to its open position by pivoting the tensioning handle from a handle base 602 about a connecting rod 604. In embodiments, and as described further herein, when transitioned from the closed to the open position, the tensioning handle 504 may engage with the shaft 606 of the rotating member such that rotation of the tensioning handle 504 around the shaft imparts a corresponding rotation of the shaft 606 and the rotating member. This rotation pulls more of the line into the entry point 608 of the tensioning device and out of the exit point 610 of the tensioning device, increasing tensioning in the line. In embodiments, when the tensioning handle 504 is transitioned back to a closed position, the tensioning handle 504 is disengaged from the shaft 606, such that any rotation of the tensioning handle 504 in the close position imparts no rotation of the shaft 606 or the rotating member.

Figure 7:
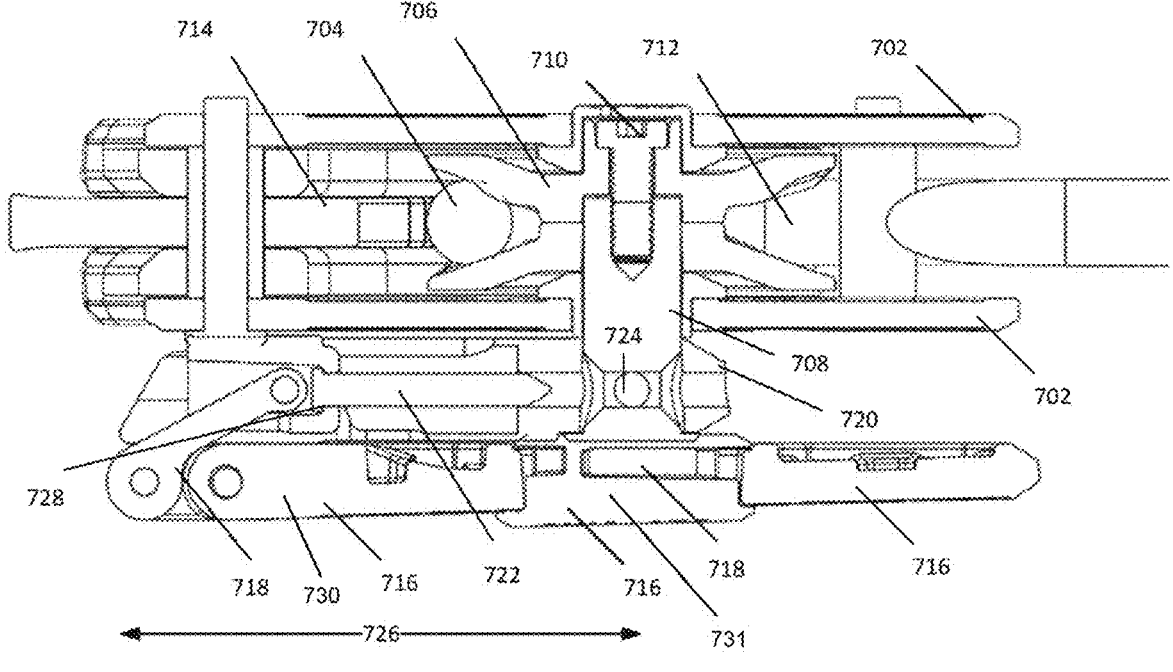
FIG. 7 is a diagram depicting a bottom view of a tensioning device with the tensioning handle in a closed position.

FIG. 7 is a diagram depicting a bottom view of a tensioning device with the tensioning handle in a closed position. The tensioning device includes an outer housing 702 in which certain components are positioned. A safety line 704 is supported and wound around a rotating member 706 that takes the form of a drum. In the example of FIG. 7, the drum 706 is fabricated in two parts (e.g., plastic or metal components) that are held together by a shaft 708 and a screw or bolt 710 connected thereto, holding the two portions of the drum together. Certain structures herein may be formed from a low friction material (e.g., plastic or metal), such as a bushings or bearings that are positioned around the shaft 708 and the bolt 710 to facilitate rotation. In the example of FIG. 7, the drum includes a slot or groove 712 to aid in supporting the line 704 such that the line does not exit its intended path around the drum 706. A locking member 714 in the form of a locking cam is configured to limit certain movement of the line 704 when engaged (e.g., by pinching the line 704 between the drum 706 and the locking member 714.

A tensioning handle 716 is illustrated in FIG. 7 in the closed position. A magnet 718 assists in retaining the tensioning handle in the closed position via attraction to the shaft 708, which in this example is made from an appropriate material to facilitate such attraction. The tensioning handle is fabricated as a plurality of segments, which may include one or more tensioning base segments 730, a pivot point segment that takes the form of a connecting rod 731 in the FIG. 7 example, and a handle base segment 720. The handle base segment 720 remains substantially flush with the outer housing 702, both when the tensioning handle 716 is in the closed and open position. When the tensioning handle 716 is rotated about the pivot point connecting rod 731, it rotates from its closed position substantially flush with the handle base segment 720 to its open position (see FIG. 8), where the tensioning handle 716 is substantially in line with the handle base segment 702.

Figure 8:
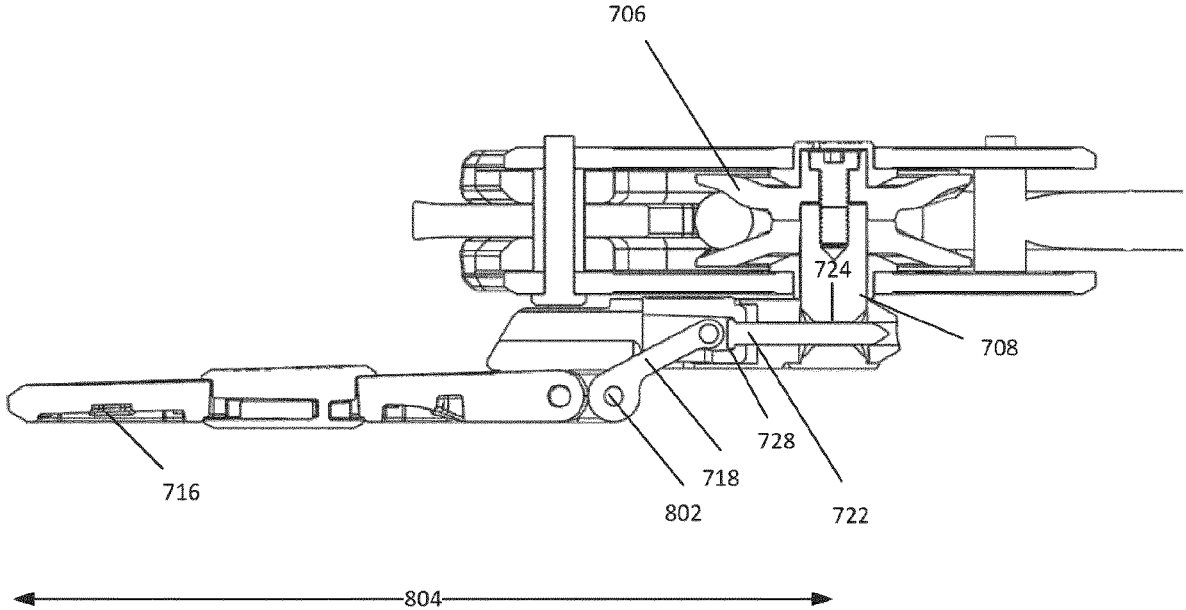
FIG. 8 is a diagram depicting a bottom view of a tensioning device with the tensioning handle in an open position.

Of note in the example of FIG. 7, is locking pin 722, which is positioned adjacent to connecting rod 718 within a pin carriage slot of the handle base segment 720. As noted above, in certain embodiments, when the tensioning handle 716 is in the closed or stowed position, the tensioning handle is disengaged from the shaft 708 and the rotating member 706. When the tensioning handle 716 is extended to the open position, the handle 716 is engaged with the shaft 708 and rotating member 706, such that rotation of the handle 716 imparts corresponding rotation of the shaft 708 and the rotating member 706. In the example of FIGS. 7 and 8, this disengagement/engagement is accomplished via the locking pin 722. As shown in FIG. 7, the shaft 708 includes one or more receptacles (e.g., chamfered through 724), into which or through which the locking pin 722 can pass. When the tensioning handle 716 is in the closed position, the locking pin 722 is configured to be in the retracted position of FIG. 7, such that it is not in contact with the shaft 708. Thus any rotational movement of the tensioning handle 716 is not imparted to the shaft 708 or the rotating member 706.

FIG. 8 is a diagram depicting a bottom view of a tensioning device with the tensioning handle in an open position. In FIG. 8, the tensioning handle 716 is engaged with the shaft 708 via the locking pin 722. Specifically, when the tensioning handle 716 is rotated about the pivot point 802 of the connecting rod 718, a lever mechanism of the connecting rod pushes the locking pin 722 toward the shaft 708 and into or through a receptacle 724 of the shaft. When the locking pin 722 is extended into the receptacle 724, the tensioning handle 716 is engaged with the shaft 708 and the rotating member 706 such that rotation of the tensioning handle 716 about the shaft 708 imparts a corresponding rotation of the shaft 708 and the rotating member. It is noted that when the tensioning handle 716 is in the open position, the distance from the end point of the tensioning handle to the center of the shaft 708, as indicated at 804, is longer than the corresponding distance when the tensioning handle 716 is in the closed position, as indicated in FIG. 7 at 726. This increased distance 804 provides a lengthened lever arm of the tensioning handle 716 when in an open position, facilitating increased force on the shaft 708 and rotating member 706, enabling tensioning of the line to a greater level (e.g., to a level required for operation according to specification). In embodiments, this additional tensioning of the line is provided without the use of tools external to the tensioning device.

In an embodiment, when the tensioning handle 716 is returned to a closed position, a ridge 728 that is responsive to movement of the connecting rod 718 pulls the locking pin 722 from within the receptacle 724 of the shaft 708, disengaging the tensioning handle 716 from the shaft 708 and the rotating member 706. In embodiments, other mechanisms for engaging the tensioning handle 716 to/from the shaft 708 may be implemented. For example, in one embodiment, extension of the tensioning arm 716 from the closed to the open position provides access to the opening in the tensioning handle base 720 such that the locking pin 722 can manually be pushed into and pulled from the receptacle 724 of the shaft (e.g., using a finger of an operator).

Figure 9:
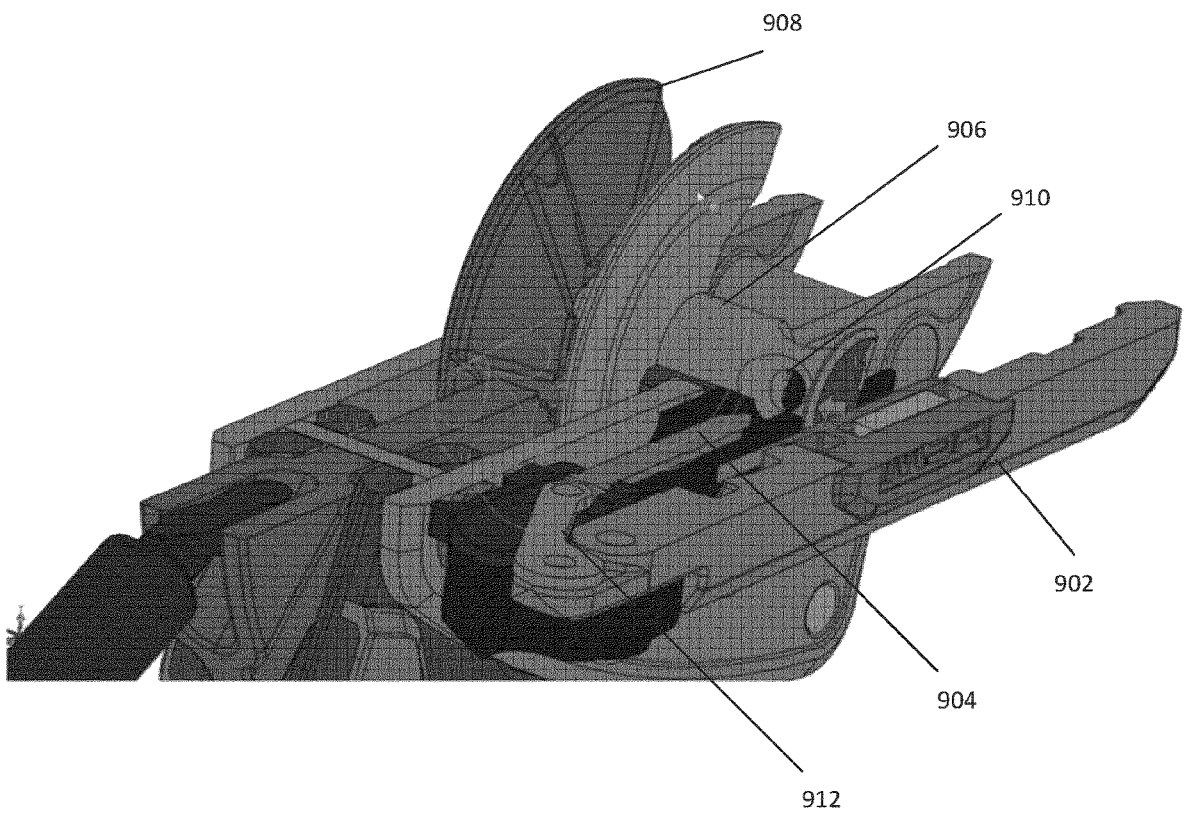
FIG. 9 is a diagram depicting example details of a shaft receptacle for receiving a locking pin.

FIG. 9 is a diagram depicting example details of a shaft receptacle for receiving a locking pin. The tensioning handle 902 is in a closed position, where a locking pin 904 is disengaged from the shaft 906 of the rotating member 908. The shaft 906 includes a plurality of receptacles 910 for accepting the locking pin 904 when engaged (e.g., when pushed into place via connecting rod 912 during extension of the tensioning handle 902 to the open position). In the example of FIG. 9, the receptacles 910 take the form of two sets of chamfered through holes that extend through the full diameter of the shaft 906, the chamfered nature of the holes facilitates extension of the locking pin 904 into the receptacles 910 even when the locking pin 904 is not in exact alignment with the receptacles 910. The two complete through holes 910 provide four entry points via which the locking pin 904 can be inserted into/through the shaft 906 to engage the tensioning handle 902 with the shaft 906 and rotating member 908. In other embodiments, the receptacles 910 may take other forms, including a greater or lesser number of through holes or receptacles that traverse less than an entirety of the diameter of the shaft 906.

Figure 10:
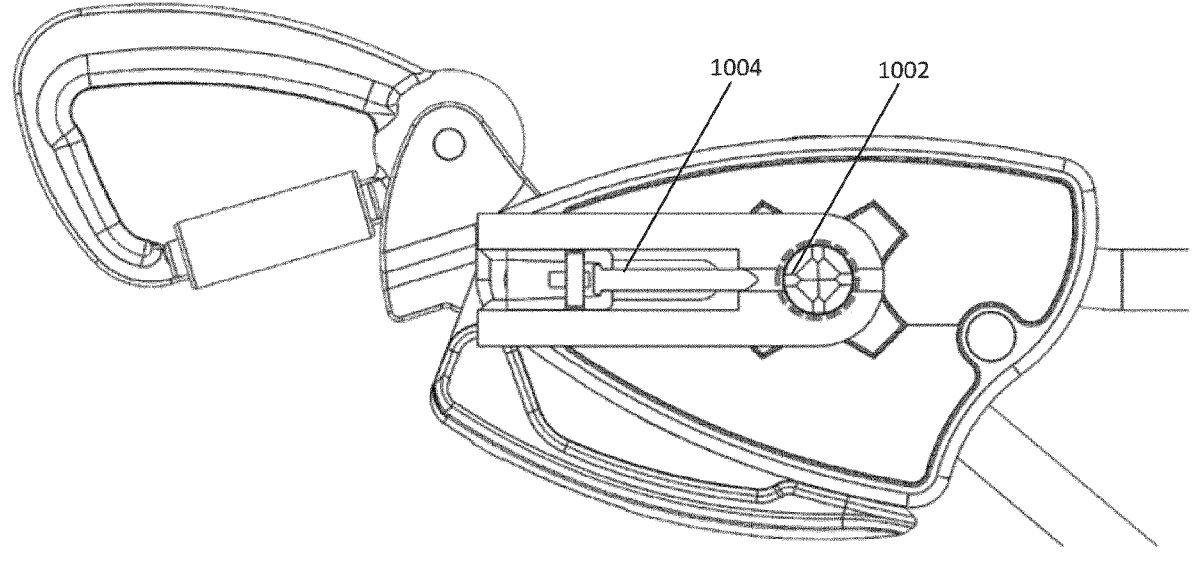
FIGS. 10 and 11 illustrate example alignment marks that indicate a position of chamfered through holes of the shaft.
Figure 11:
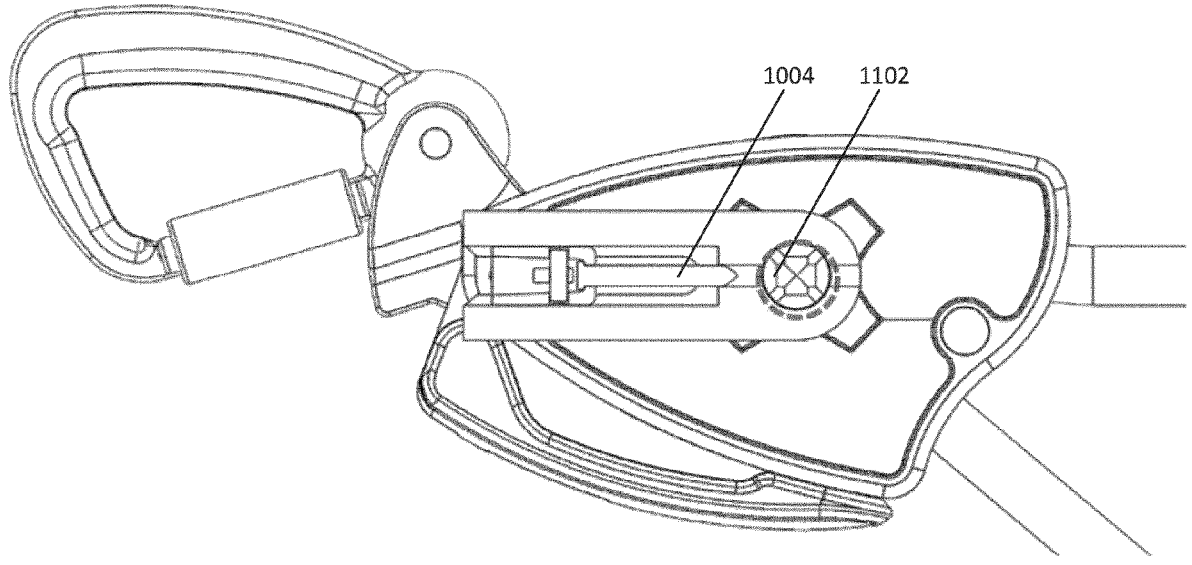

To assist with alignment, an exterior facing surface of the shaft may include alignment markers for aiding an operator in aligning the locking pin with a shaft receptacle. FIGS. 10 and 11 illustrate example alignment marks that indicate a position of chamfered through holes of the shaft. In FIG. 10, a pointed indicator at 1002 indicates that there is a chamfered through hole of the shaft in line with the current position of the locking pin 1004, such that extension of the tensioning handle will result in successful engagement of the tensioning handle with the shaft. In FIG. 11, a flat indicator at 1102 indicates to an operator that extension of the tensioning handle may not result in successful engagement of the tensioning handle with the shaft due to misalignment of the locking pin 1004 with the shaft receptacle. In such an instance, the operator may need to rotate the tensioning handle (e.g., one quarter of a turn in either direction) in a closed, or less than fully open position to align the locking pin 1004 with the receptacle. Alignment marks may take a variety of forms, such as those depicted in FIGS. 10-11, arrows as depicted in FIG. 9, or other pattern as shown in FIG. 12.

Figure 12:
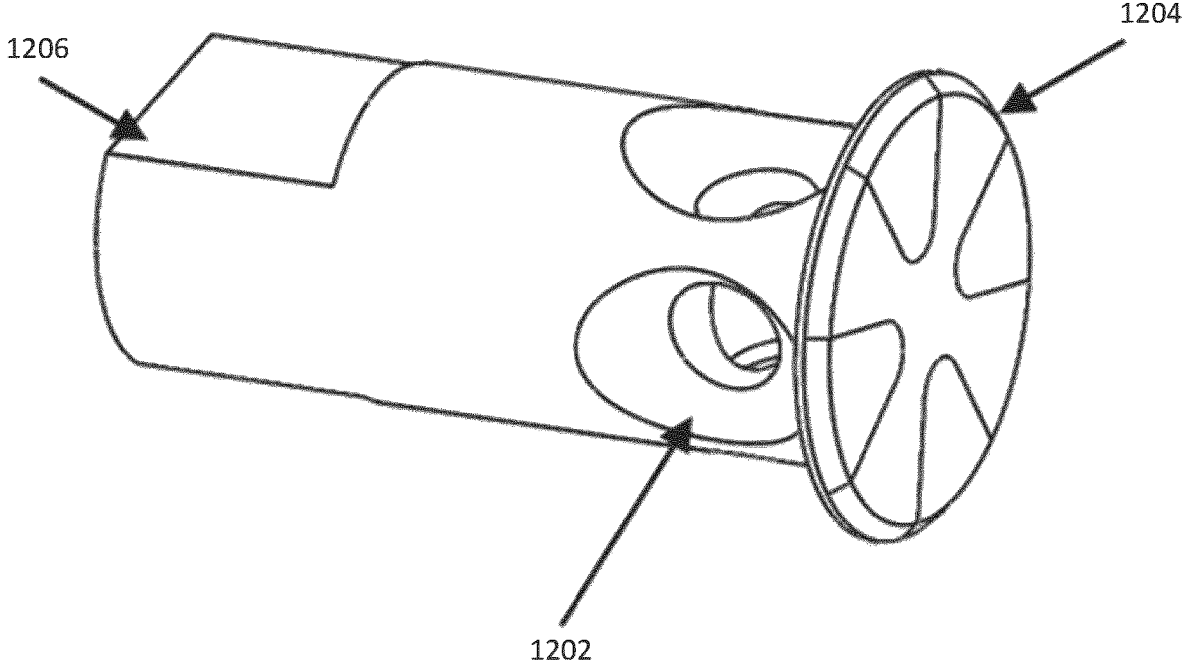
FIG. 12 provides an isolated view of an example shaft.

FIG. 12 provides an isolated view of an example shaft. The shaft includes a plurality of receptacles 1202 (e.g., chamfered through holes) for accepting a locking pin or other mechanism for engaging a tensioning handle with the shaft. An outward facing surface 1204 of the shaft includes alignment marks for illustrating the position of the receptacles for aiding alignment of the locking pin with a receptacle. The shaft further includes a flattened portion at 1206 for interfacing with the rotating member. Because a significant amount of force may be imparted by a tensioning handle to rotate the shaft and the rotating member, a flattened portion 1206 of the shaft for interfacing with a commonly shaped portion of the rotating member may enable better rotation of the rotating member (e.g., without slipping).

Figure 13:
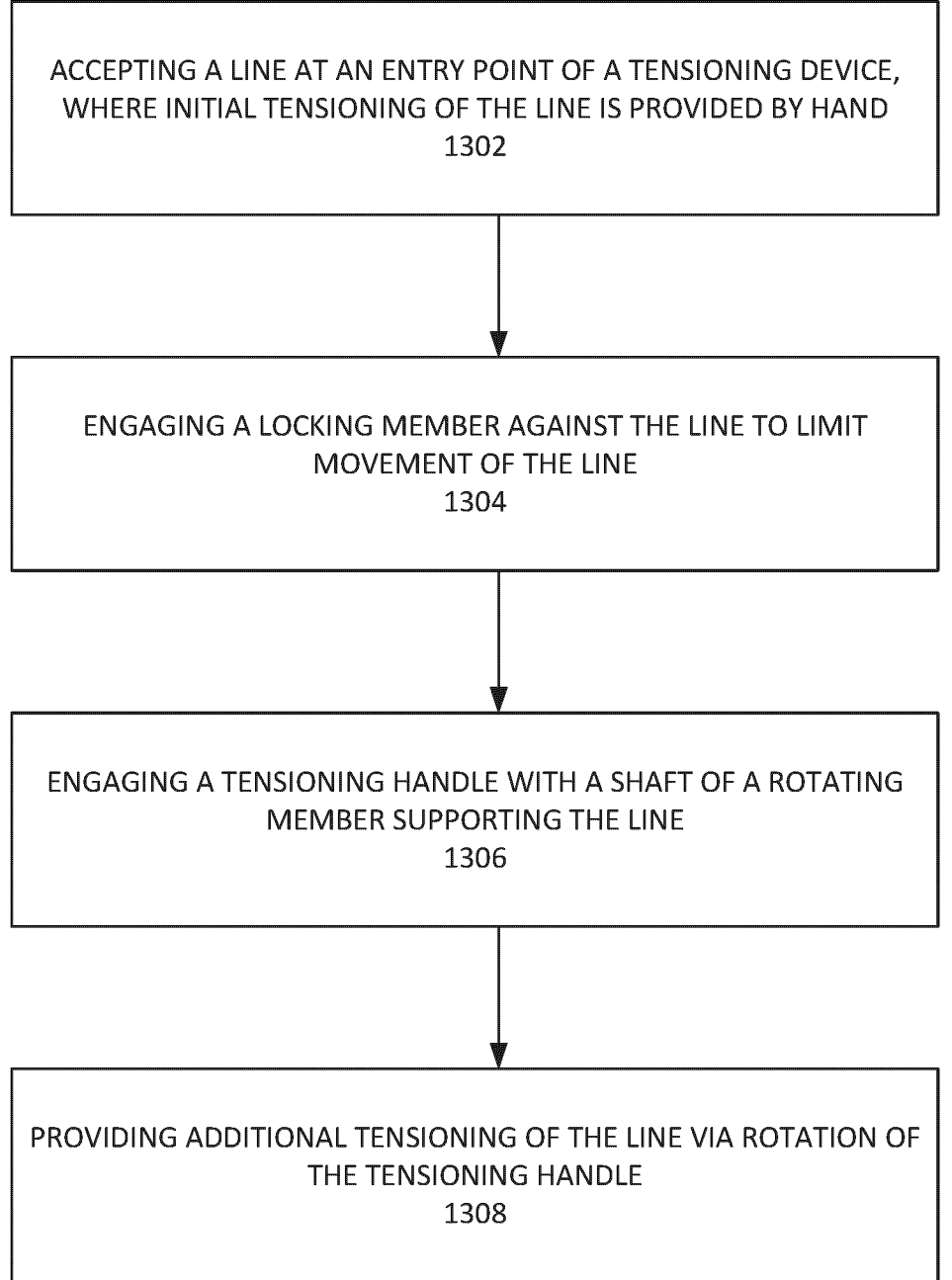
FIG. 13 is a flow diagram depicting an example method of increasing tension in line.

FIG. 13 is a flow diagram depicting an example method of increasing tension in a line. At 1302, a line is accepted at an entry point of a tensioning device such that the line is guided around a rotating member and exits the tensioning device at an exit point, where initial tensioning of the line is provided via hand pulling of the line through the exit point. At 1304, a locking member is engaged against the line, where the locking member is configured to limit movement of the line such that the line can only be rotated around the rotating member in one direction. At 1306, a tensioning handle is engaged with a shaft of the rotating member when the tensioning handle is transitioned from a closed position to an open position, and at 1308, additional tensioning of the line is provided when the handle is rotated via corresponding rotation of the shaft and the rotating member.

Systems and methods as described herein may take a variety of forms. In one example, a tensioning device system is configured for increasing tension in a line. A system may include a rotating member configured to support a line, the rotating member being configured to rotate around a shaft. A locking member is configured to limit movement of the line when the line is supported by the rotating member. A tensioning handle is configured to have a closed position and an open position, where the tensioning handle is disengaged from the shaft when in a closed position, and where the tensioning handle is configured to be engaged with the shaft when the tensioning handle is in an open position.

A system or method may include one or more additional features, alone or in combination. In those example features, a tensioning device system may include a locking pin that is configured to be extended into a receptacle of the shaft when the tensioning handle is engaged with the shaft. The tensioning handle may further include a lever mechanism that is configured to push the locking pin into the receptacle when the tensioning handle is moved into an open position. A tensioning handle may include a plurality of segments, wherein a particular one of the segments is connected to a pivot point, wherein the particular one of the segments is configured to push the locking pin into the receptacle as the tensioning handle is rotated about the pivot point in being moved from the closed position to the open position. The receptacle comprises a plurality of chamfered through holes that traverse a diameter of the rotating member. The shaft comprises an outward facing surface, wherein the outward facing surface includes alignment marks that identify positions of the chamfered through holes. The tensioning handle in the open position may extend further from the shaft than the tensioning handle extends in the closed position thereby increasing leverage for rotating the shaft when the tensioning handle is engaged with the shaft. The tensioning handle may be configured to be rotated when in the open position, where rotation of the tensioning handle in the open position provides a corresponding rotation of the shaft, the rotating member, and the line supported thereon. The locking member may be configured to allow rotation of the rotating member supporting the line in only one direction when the locking member is fully engaged with the line. Rotation of the rotating member in the one direction may increase tension in the line. The locking member may include a locking cam that is connected to a rigid structure or a component that is configured to move as tension of the line is increased, wherein the locking cam is configured to increase a force applied to the line as tension of the line is increased. The device may further include a release handle, where the release handle is configured to interface with the locking cam when operated to at least partially disengage the locking cam so as to relieve the force applied to the line. The tensioning handle may be retained in the closed position via a magnet. The device may include an entry point configured to accept the line and guide the line around the rotating member, wherein the device includes an exit point for accommodating an excess portion of the line after the line has traversed the rotating member. The device may be configured to facilitate an initial tensioning of the line via hand pulling of the excess portion of the line, where the device is configured for additional tensioning of the line via the tensioning handle after initial tensioning. The device may be configured to provide the additional tensioning without use of tools external to the device. The rotating member may take the form of a drum.

In another example, a tensioning line system includes a line configured for connection to a first rigid structure. A tensioning device includes a rotating member configured to rotate around a shaft; a locking member configured to limit movement of the line; and a tensioning handle configured to have a closed position and an open position, where the tensioning handle is disengaged from the shaft when in a closed position, and where the tensioning handle is configured to be engaged with the shaft when the tensioning handle is in an open position. The tensioning device is configured to be directly or indirectly connected to a second rigid structure.

In an example, the tensioning line system may further include one or more of one or more connectors configured to slide along the line; and one or more energy absorbers configured for connection to the tensioning device or the line.

In a further example, an example method of increasing tension in a line is provided. A line is accepted at an entry point of a tensioning device such that the line is guided around a rotating member and exits the tensioning device at an exit point, where initial tensioning of the line is provided via hand pulling of the line through the exit point. A locking member is engaged against the line, where the locking member is configured to limit movement of the line such that the line can only be rotated around the rotating member in one direction. A tensioning handle is engaged with a shaft of the rotating member when the tensioning handle is transitioned from a closed position to an open position, and additional tensioning of the line is provided when the handle is rotated via corresponding rotation of the shaft and the rotating member.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A tensioning device configured for increasing tension in a line, comprising:
   a rotating member configured to support the line, the rotating member being configured to rotate around a shaft;
   a locking member configured to limit movement of the line when the line is supported by the rotating member;
   a tensioning handle configured to have a closed position and an open position, wherein the tensioning handle is disengaged from the shaft when in a closed position, wherein the tensioning handle is configured to be engaged with the shaft when the tensioning handle is in an open position; and
   a locking pin that is configured to be extended into a receptacle of the shaft when the tensioning handle is engaged with the shaft.

2. The device of claim 1, wherein the tensioning handle further comprises:
   a lever mechanism that is configured to push the locking pin into the receptacle when the tensioning handle is moved into an open position.

3. The device of claim 1, wherein the tensioning handle comprises a plurality of segments, wherein a particular one of the segments is connected to a pivot point, wherein the particular one of the segments is configured to push the locking pin into the receptacle as the tensioning handle is rotated about the pivot point in being moved from the closed position to the open position.

4. The device of claim 1, wherein the receptacle comprises a plurality of chamfered through holes that traverse a diameter of the rotating member.

5. The device of claim 4, wherein the shaft comprises an outward facing surface, wherein the outward facing surface includes alignment marks that identify positions of the chamfered through holes.

6. The device of claim 1, wherein the tensioning handle in the open position extends further from the shaft than the tensioning handle extends in the closed position thereby increasing leverage for rotating the shaft when the tensioning handle is engaged with the shaft.

7. The device of claim 6, wherein the tensioning handle is configured to be rotated when in the open position, wherein rotation of the tensioning handle in the open position provides a corresponding rotation of the shaft, the rotating member, and the line supported thereon.

8. The device of claim 7, wherein the locking member is configured to allow rotation of the rotating member supporting the line in only one direction when the locking member is fully engaged with the line.

9. The device of claim 8, wherein rotation of the rotating member in the one direction increases tension in the line.

10. The device of claim 1, wherein the locking member comprises a locking cam that is connected to a rigid structure or a component that is configured to move as tension of the line is increased, wherein the locking cam is configured to increase a force applied to the line as tension of the line is increased.

11. The device of claim 10, wherein the device further comprises a release handle, wherein the release handle is configured to interface with the locking cam when operated to at least partially disengage the locking cam so as to relieve the force applied to the line.

12. The device of claim 1, wherein the tensioning handle is retained in the closed position via a magnet.

13. The device of claim 1, wherein the device includes an entry point configured to accept the line and guide the line around the rotating member, wherein the device includes an exit point for accommodating an excess portion of the line after the line has traversed the rotating member.

14. The device of claim 13, wherein the device is configured to facilitate an initial tensioning of the line via hand pulling of the excess portion of the line;

wherein the device is configured for additional tensioning of the line via the tensioning handle after initial tensioning.

15. The device of claim 14, wherein the device is configured to provide the additional tensioning without use of tools external to the device.

16. The device of claim 1, wherein the rotating member is a drum.

17. The device of claim 1, wherein a surface of the locking member has a texture which interfaces with the line, allows motion of the line in a first direction, and impedes motion of the line in a second direction opposite the first direction.

18. A tensioning line system, comprising:

a line configured for connection to a first rigid structure;
   a tensioning device, comprising:
   a rotating member configured to rotate around a shaft;
   a locking member configured to limit movement of the line;
   a tensioning handle configured to have a closed position and an open position, wherein the tensioning handle is disengaged from the shaft when in a closed position, and wherein the tensioning handle is configured to be engaged with the shaft when the tensioning handle is in an open position; and a locking pin that is configured to be extended into a receptacle of the shaft when the tensioning handle is engaged with the shaft;
   wherein the tensioning device is configured to be directly or indirectly connected to a second rigid structure.

19. The tensioning line system of claim 18, further comprising: one or more connectors configured to slide along the line;

one or more energy absorbers configured for connection to the tensioning device or the line.

20. A method of increasing tension in a line, comprising:

accepting the line at an entry point of a tensioning device such that the line is guided around a rotating member and exits the tensioning device at an exit point, wherein initial tensioning of the line is provided via hand pulling of the line through the exit point;
   engaging a locking member against the line, wherein the locking member is configured to limit movement of the line such that the line can only be rotated around the rotating member in one direction;
   engaging a tensioning handle with a shaft of the rotating member when the tensioning handle is transitioned from a closed position to an open position, wherein the tensioning handle is configured to be retained in the closed position by a magnet or physical stop; and
   providing additional tensioning of the line when the handle is rotated via corresponding rotation of the shaft and the rotating member.

\* \* \* \* \*